US012043585B1

(12) United States Patent
Peters et al.

(10) Patent No.: US 12,043,585 B1
(45) Date of Patent: Jul. 23, 2024

(54) RAPID-SETTING CELLULAR BACKFILL WITH CALCIUM SULFOALUMINATE CEMENT AND OTHER POWDER-SIZED FILLER MATERIALS

(71) Applicant: FlashSet, LLC, Schertz, TX (US)

(72) Inventors: Stanley R. Peters, Castle Rock, CO (US); George Clarence Geal, III, Parker, CO (US)

(73) Assignee: FlashSet, LLC, Schertz, TX (US)

( * ) Notice: Subject to any disclaimer, the term of this patent is extended or adjusted under 35 U.S.C. 154(b) by 0 days.

(21) Appl. No.: 16/942,336

(22) Filed: Jul. 29, 2020

Related U.S. Application Data

(60) Provisional application No. 62/880,045, filed on Jul. 29, 2019.

(51) Int. Cl.
| C04B 7/32 | (2006.01) |
| C04B 14/28 | (2006.01) |
| C04B 14/42 | (2006.01) |
| C04B 18/08 | (2006.01) |

(52) U.S. Cl.
CPC .............. C04B 7/323 (2013.01); C04B 14/28 (2013.01); C04B 14/42 (2013.01); C04B 18/084 (2013.01); C04B 18/088 (2013.01); C04B 2201/52 (2013.01)

(58) Field of Classification Search
CPC ....... C04B 7/323; C04B 14/42; C04B 18/084; C04B 18/088; C04B 2201/52; C04B 14/28; C04B 14/00; C04B 18/04; C04B 18/06; C04B 18/08; C04B 7/00; C04B 7/26; C04B 7/28; C04B 7/32; C04B 28/06; C04B 28/065; C04B 18/106; C04B 33/135; F23J 2217/101
USPC ....................................................... 106/695
See application file for complete search history.

(56) References Cited

U.S. PATENT DOCUMENTS

| 1,782,471 | A | 11/1930 | Kirchener |
| 1,968,152 | A | 7/1934 | Kirchener |
| 2,307,485 | A | 1/1943 | Booth |
| 2,434,301 | A | 1/1948 | Wertz |
| 2,600,018 | A | 6/1952 | Nelson et al. |
| 2,806,531 | A | 9/1957 | Morgan et al. |
| 2,819,171 | A | 1/1958 | Benedict et al. |
| 2,820,713 | A | 1/1958 | Wagner |
| 2,890,965 | A | 6/1959 | Underdown et al. |
| 3,008,843 | A | 11/1961 | Jolly |
| 3,427,175 | A | 2/1969 | Angstadt et al. |
| 3,625,723 | A | 12/1971 | Sicka |
| 3,729,328 | A | 4/1973 | Magder |
| 4,042,408 | A | 8/1977 | Murray et al. |
| 4,209,336 | A | 6/1980 | Previte |
| 4,264,367 | A | 4/1981 | Schutz |
| 4,444,593 | A | 4/1984 | Schutz |
| 4,624,711 | A | 11/1986 | Styron |
| 4,659,385 | A | 4/1987 | Costopoulos |
| 4,741,782 | A | 5/1988 | Styron |
| 4,900,359 | A | 2/1990 | Gelbman |
| 5,106,422 | A | 4/1992 | Bennett et al. |
| 5,183,505 | A | 2/1993 | Spinney |
| 5,211,751 | A | 5/1993 | Arfaei et al. |
| 5,419,632 | A | 5/1995 | Stephens |
| 5,435,843 | A * | 7/1995 | Roy .......................... C04B 7/26 |
| | | | 106/789 |
| 5,494,514 | A | 2/1996 | Goodson et al. |
| 5,736,594 | A | 4/1998 | Boles |
| 5,785,751 | A | 7/1998 | Bashlykov et al. |
| 5,921,707 | A | 7/1999 | Owen |
| 6,485,561 | B1 | 11/2002 | Dattel |
| 6,641,658 | B1 | 11/2003 | Dubey |
| 6,648,962 | B2 | 11/2003 | Berke et al. |
| 6,767,399 | B2 * | 7/2004 | Peev ....................... C04B 24/32 |
| | | | 106/808 |
| 6,869,474 | B2 | 3/2005 | Perez-Pena et al. |
| 7,029,527 | B2 | 4/2006 | Gaudry et al. |
| 7,413,014 | B2 | 8/2008 | Chatterji et al. |
| 7,427,321 | B2 | 9/2008 | Hilton et al. |
| 7,468,154 | B2 | 12/2008 | Dubey |
| 7,670,427 | B2 | 3/2010 | Perez-Pena et al. |
| 7,790,302 | B2 | 9/2010 | Ladely (Guevara) |

(Continued)

FOREIGN PATENT DOCUMENTS

| BE | 508098 | 1/1952 |
| BE | 582948 | 1/1960 |

(Continued)

OTHER PUBLICATIONS

Federal Highway Administration "User Guidelines for Waste and Byproduct Materials in Pavement Construction" retrieved from https://www.fhwa.dot.gov/publications/research/infrastructure/structures/97148/qbp121.cfm (Year: 2016).*
Definition and Classification of Limestone, prepared by Missouri Department of Natural Resources, Division of Geology and Land Survey, 2011. Retrieved from the internet at Jul. 18, 2022 from <URL:https://dnr.mo.gov/document-search/definition-classification-limestone>]. (Year: 2011).*
KR20170013429A, machine translation (Year: 2017).*
Allen, Marilyn H., "Pacific International Grout Co.", AUA News Magazine, 2000, 4 pgs., Transcontinental Publishing, Inc., Phoenix, AZ, USA.
American Coal Ash Association, "Fly Ash Facts for Highway Engineers", Technical Report, Jun. 13, 2003, 81 pgs.
American Electric Power, "Flash Fill", No Date, 5 pgs., American Electric Power, Columbus, OH, USA.

(Continued)

*Primary Examiner* — Anthony J Green
*Assistant Examiner* — Marites A Guino-O Uzzle
(74) *Attorney, Agent, or Firm* — Merchant and Gould, PC

(57) ABSTRACT

A composition for backfilling a void. The composition may include between 40% and 65% air by volume, between 20% and 50% water by weight, between 5% and 50% calcium sulfoaluminate cement by weight, and between 20% and 55% filler by weight. The composition may have a compressive strength between 10 psi and 170 psi at four hours, a compressive strength between 20 psi and 310 psi at one day, and a compressive strength between 30 psi and 520 psi at twenty-eight days.

12 Claims, No Drawings

(56) References Cited

U.S. PATENT DOCUMENTS

| | | |
|---|---|---|
| 7,842,348 B2 | 11/2010 | Abbott et al. |
| 8,167,998 B2 | 5/2012 | Ladely et al. |
| 8,172,937 B2 | 5/2012 | Masloff et al. |
| 8,747,547 B1 | 6/2014 | Peters |
| 8,822,567 B2 | 9/2014 | Kono et al. |
| 8,882,905 B1 | 11/2014 | Peters |
| 9,038,719 B2 | 5/2015 | Crews |
| 9,376,343 B2 | 6/2016 | Hernandez |
| 9,382,156 B2 | 7/2016 | Ren |
| 9,802,863 B1 * | 10/2017 | Geal, III ............... C04B 18/08 |
| 10,266,453 B2 * | 4/2019 | Peters ...................... E01C 3/06 |
| 10,322,971 B1 | 6/2019 | Geal, III |
| 2002/0117088 A1 | 8/2002 | Norman et al. |
| 2003/0041785 A1 | 3/2003 | Harrison |
| 2008/0176967 A1 | 7/2008 | Bui |
| 2008/0227891 A1 | 9/2008 | Jarvie et al. |
| 2009/0011207 A1 | 1/2009 | Dubey |
| 2009/0114126 A1 | 5/2009 | Roddy et al. |
| 2010/0064943 A1 | 3/2010 | Guevara et al. |
| 2010/0095871 A1 | 4/2010 | Patil et al. |
| 2011/0021668 A1 | 1/2011 | Hamai et al. |
| 2012/0037046 A1 | 2/2012 | Le Rolland et al. |
| 2012/0040165 A1 | 2/2012 | Dubey |
| 2014/0083698 A1 | 3/2014 | Stone et al. |
| 2014/0138007 A1 | 5/2014 | Dubey et al. |
| 2014/0311387 A1 | 10/2014 | Hohn et al. |
| 2015/0000568 A1 * | 1/2015 | Bescher ............... C04B 28/065 |
| | | 106/692 |
| 2015/0175887 A1 | 6/2015 | Welker |
| 2015/0240163 A1 | 8/2015 | Welker |
| 2015/0291476 A1 | 10/2015 | Al-mutlaq |
| 2016/0257620 A1 * | 9/2016 | Peters ...................... E01C 3/06 |
| 2018/0311674 A1 * | 11/2018 | de Vries ................. B07B 13/10 |
| 2019/0185386 A1 | 6/2019 | Peters |
| 2020/0377415 A1 * | 12/2020 | Nissinen ................ C04B 14/28 |

FOREIGN PATENT DOCUMENTS

| | | | |
|---|---|---|---|
| CA | 412214 | 5/1943 | |
| CA | 419133 | 3/1944 | |
| CA | 419134 | 3/1944 | |
| CA | 419135 | 3/1944 | |
| CA | 462493 | 1/1950 | |
| CA | 520832 | 1/1956 | |
| CA | 566361 | 11/1958 | |
| CA | 607361 | 10/1960 | |
| CA | 607391 | 10/1960 | |
| CA | 625024 | 8/1961 | |
| CA | 713618 | 7/1965 | |
| CA | 900635 | 5/1972 | |
| CA | 1204456 | 5/1986 | |
| CN | 101670619 | 3/2010 | |
| CN | 111302831 A * | 6/2020 | ........... C04B 14/024 |
| DE | 1807608 | 6/1970 | |
| EP | 114448 | 8/1984 | |
| EP | 127960 | 12/1984 | |
| EP | 402306 | 12/1990 | |
| EP | 2520553 | 11/2012 | |
| EP | 1532080 | 3/2014 | |
| EP | 2832706 | 2/2015 | |
| EP | 2414301 | 11/2015 | |
| FR | 38549 | 6/1931 | |
| FR | 1591415 | 4/1970 | |
| FR | 2061507 | 6/1971 | |
| GB | 301509 | 1/1930 | |
| GB | 430781 | 6/1935 | |
| GB | 791622 | 3/1958 | |
| GB | 833071 | 4/1960 | |
| GB | 1181331 | 2/1970 | |
| GB | 1315225 | 5/1973 | |
| IN | 154852 | 12/1984 | |
| IN | 159750 | 6/1987 | |
| JP | 6040756 | 2/1994 | |
| JP | H-06-040756 | 2/1994 | |
| JP | 6298552 | 10/1994 | |
| JP | H-6298552 | 10/1994 | |
| JP | 1996029963 | 3/1996 | |
| JP | 2802972 | 9/1998 | |
| JP | 11217253 | 8/1999 | |
| JP | H11217253 | 8/1999 | |
| JP | 2000007402 | 1/2000 | |
| JP | 2000095554 | 4/2000 | |
| JP | 3125316 | 1/2001 | |
| JP | 2004002080 | 1/2004 | |
| JP | 3558730 | 8/2004 | |
| JP | 2005324982 | 11/2005 | |
| JP | 2006298661 | 11/2006 | |
| JP | 4157485 | 10/2008 | |
| JP | 4290628 | 7/2009 | |
| JP | 4348001 | 10/2009 | |
| JP | 2010150105 | 7/2010 | |
| JP | 4626541 | 2/2011 | |
| JP | 4705455 | 6/2011 | |
| JP | 4725742 | 7/2011 | |
| JP | 4813822 | 11/2011 | |
| JP | 4837161 | 12/2011 | |
| JP | 4860396 | 1/2012 | |
| JP | 4877886 | 2/2012 | |
| JP | 5051990 | 10/2012 | |
| JP | 5113496 | 1/2013 | |
| JP | 2013170436 | 9/2013 | |
| JP | 2013077378 | 4/2015 | |
| JP | 2015124141 | 7/2015 | |
| JP | 2015229684 | 12/2015 | |
| KR | 100311286 | 9/2001 | |
| KR | 1020120016432 | 2/2012 | |
| KR | 20170013429 A * | 2/2017 | |
| LU | 57288 | 2/1969 | |
| RU | 2099302 | 12/1997 | |
| RU | 2102356 | 1/1998 | |
| RU | 2119900 | 10/1998 | |
| RU | 2186942 | 8/2002 | |
| RU | 2257294 | 7/2005 | |
| RU | 2337124 | 10/2008 | |
| RU | 2434923 | 11/2011 | |
| RU | 2470979 | 12/2012 | |
| RU | 2497861 | 11/2013 | |
| RU | 2525408 | 8/2014 | |
| RU | 2542063 | 2/2015 | |
| RU | 2545208 | 3/2015 | |
| RU | 2553807 | 6/2015 | |
| RU | 2555683 | 7/2015 | |
| SU | 848594 | 7/1981 | |
| SU | 876960 | 10/1981 | |
| SU | 1411439 | 7/1988 | |
| SU | 1435762 | 11/1988 | |
| SU | 1585309 | 8/1990 | |
| SU | 1682531 | 10/1991 | |
| WO | 8601795 | 3/1986 | |
| WO | 51947 | 9/2000 | |
| WO | 2008130107 | 10/2008 | |
| WO | 2010047919 | 4/2010 | |
| WO | 2011139466 | 11/2011 | |
| WO | 2012136963 | 10/2012 | |
| WO | 2014068409 | 5/2014 | |
| WO | 2014072533 | 5/2014 | |
| WO | 2015034531 | 3/2015 | |
| WO | 2015034543 | 3/2015 | |
| WO | WO-2015032484 A1 * | 3/2015 | ............. C04B 7/323 |
| WO | 2015130284 | 9/2015 | |
| WO | 2016043500 | 3/2016 | |

OTHER PUBLICATIONS

Behlen, Thomas P., Letter Dated Apr. 6, 1992 Regarding Flash Fill Technical Review, 3 pgs.

Bost et al., "Comparison of the accelerating effect of various additions on the early hydration of Portland cement," Construction and Building Materials, Jun. 15, 2016, 2 pages.

Bruce A. Suprenant, Adjusting Slump in the Field, 1994.

Cellular Concrete LLC, "Synthetic Concrete Foam", Material Safety Data Sheet, Jul. 24, 2008, pp. 1-5.

(56) References Cited

OTHER PUBLICATIONS

Cross et al., "A Green Gem in the Treasure State", Ash at Work, 2009, pp. 13-19, Issue 1.
Cross et al., "Evaluation of the Durability of 100 Percent Fly Ash Concrete", Jun. 2008, 46 pgs., Project No. 05-CBRC-W08, Western Transportation Institute, Bozeman, MT, USA.
Cross et al., "Field Trials of 100% Fly Ash Concrete", Concrete International, Sep. 2005, 3 pgs., obtained online at: http://findarticles.com/p/articles/mi_qa5363/is_200509/ai_n21386494/.
Cross et al., "Structural Applications of 100 Percent Fly Ash Concrete", No Date, pp. 1-19.
Cross et al., "Sustainable Construction Contributions from the Treasure State", Concrete International, May 2010, pp. 41-46, vol. 32, No. 5.
Duran, Darin R., Letter Report Dated Aug. 18, 2010 Regarding Flashfill Frost Heave Study, Project No. D10.035, 25 pgs.
Folliard et al., "Development of a Recommended Practice for Use of Controlled Low-Strength Material in Highway Construction", NCHRP Report 597, 2008, p. 29, Transportation Research Board, Washington, D.C., USA.
Glysson et al., "Guide for Cast-in-Place Low-Density Cellular Concrete", Reported by ACI Committee 523, ACI Committee Report, No Date, pp. 523.1R-1 to 523.1R-13, ACI 523.1R-06.
Hennis et al., "A New Era in Control Density Fill", No Date, pp. 53-1 to 53-12, American Electric Power, Columbus, OH, USA.
Juenger et al., "A soft X-ray microscope investigation into the effects of calcium chloride on tricalcium silicate hydration," Cement and Concrete Research, Jan. 1, 2005, 2 pages.
Kosmatka et al., "Design and Control of Concrete Mixtures," The guide to applications, methods, and materials, 15th edition, Engineering Bulletin 001, Portal Cement Association, 2011, p. 91.
Lautzenheiser, Robert, Letter Dated Sep. 12, 1996 Regarding Flash Fill Product, 1 pg.
Letter Dated Sep. 17, 1990 Regarding Use of Fly Ash as a Backfill Material, 1 pg.
Odler et al., "On the combined effect of water solubles lignosulfonates and carbonates on Portland cement and clinker pastes 1. Physical properties," Cement and Concreate Research, Jul. 1, 1978, 2 pages.
Peters, Stan, "Flowable Fill Using Spray Dryer Ash", Ash at Work, 2011, pp. 40-41, Issue 1.
Ramme et al., "Controlled Low-Strength Materials", Reported by ACI Committee 229, Manual of Concrete Practice, 2005, pp. 229R-1 to 229R-15, American Concrete Institute, Farmington Hills, MI, USA.
Rapp, "Effect of Calcium Chloride on Portland Cements and Concretes," Journal of Research of the National Bureau of Standars, Apr. 1, 1935, 2 pages.
Rosenberg, "Study of the Mechanism Through Which Calcium Chloride Accelerates the Set of Portland," Oct. 1, 1964, 2 pages.
Sheets, Dana M., Letter Dated Jan. 24, 1991 Regarding Flowable Fly Ash Backfill Material, 2 pgs.
Sheets, Dana M., Letter Dated Sep. 10, 1996 Regarding Leachate Test Results, 2 pgs.
Stephens, Pat, "Pacific Grout Rescues TBM and Backfills Tunnels", Trenchless Technology, Oct. 1996, 2 pgs.
Turner, Andrew, Letter Dated Feb. 8, 1991, 1 pg.
Williams et al., "Developing Mixture Proportion Guidance for Field-Prepared Rapid-Setting Materials for Emergency Airfield Repairs," Feb. 8, 2012, 2 pages.
Witlbank et al., "Effect of Selected Accelerants on the Physical Properties of Mineral Trioxide Aggregate and Portland Cement," Journal of Endodontics, Oct. 1, 2007, 2 pages.

* cited by examiner

RAPID-SETTING CELLULAR BACKFILL WITH CALCIUM SULFOALUMINATE CEMENT AND OTHER POWDER-SIZED FILLER MATERIALS

RELATED APPLICATIONS

This application claims priority to U.S. Provisional Patent Application Ser. No. 62/880,045, filed on Jul. 29, 2019.

INTRODUCTION

The present disclosure generally relates to a rapid-setting cellular backfill material with calcium sulfoaluminate cement and other powder-sized filler materials. This invention is useful in filling portions of voids, such as mine shafts and excavated utility trenches, where traditional slow setting mixtures are not desired. It provides an alternate means of producing a rapid-setting utility backfill material, in areas where rapid-setting Class C fly ash is not available or not practical.

The demand to open roadways quickly after roadway construction continues to accelerate as the population increases and the use of roads becomes heavier. Contractors are continuously pressured to backfill any trenches or voids created in the roadway (e.g., as a result of construction) and to rapidly place an asphalt patch on the backfilled trench or void in less than a four-hour duration, which is considered quick compared to traditional Portland-cement based CLSMs (Controlled Low Strength Materials, as defined by ACI 229). The present invention discloses compositions and methods to quickly backfill trenches or voids in a roadway thereby allowing use of the roadway to return to normal as quickly as possible.

The present invention is also applicable in underground mines, where tunnels & mine shafts need to be sealed off to control air flows and/or seal off an underground coalmine fire. Traditional lightweight, cellular concretes made with traditional Portland cement are very fluid & pumpable, but too slow in setting to accomplish adequate seals in the tunnels & shafts. A faster setting mixture is needed, to allow faster filling, in quick-hardening layers.

SUMMARY

The present disclosure identifies composition for backfilling a void comprising between 40% and 65% air by volume, between 20% and 50% water by weight, between 5% and 50% calcium sulfoaluminate cement by weight, and between 20% and 55% filler by weight. The composition can have a compressive strength between 10 psi and 170 psi at four hours, a compressive strength between 20 psi and 310 psi at one day, and a compressive strength between 30 psi and 520 psi at twenty-eight days. In some embodiments the filler may be scrubbed ash, baghouse fines, fly ash, agricultural lime, recycled glass, or combinations thereof.

The present disclosure includes compositions where the filler is scrubbed ash and the composition has a compressive strength between 15 psi and 150 psi at four hours, a compressive strength between 20 psi and 310 psi at one day, and a compressive strength between 130 psi and 520 psi at twenty-eight days.

The present disclosure includes compositions where the filler is baghouse fines and the composition has a compressive strength between 10 psi and 170 psi at four hours, a compressive strength between 20 psi and 200 psi at one day, and a compressive strength between 30 psi and 220 psi at twenty-eight days.

The present disclosure includes compositions where the filler is fly ash and the composition has a compressive strength between 30 psi and 50 psi at four hours, a compressive strength between 100 psi and 120 psi at one day, and a compressive strength between 180 psi and 200 psi at twenty-eight days.

The present disclosure includes compositions where the filler is agricultural lime and the composition has a compressive strength between 115 psi and 155 psi at four hours, a compressive strength between 140 psi and 180 psi at one day, and a compressive strength between 115 psi and 220 psi at twenty-eight days.

The present disclosure includes compositions where the filler is recycled glass and the composition has a compressive strength between 25 psi and 55 psi at four hours, a compressive strength between 65 psi and 95 psi at one day, and a compressive strength between 85 psi and 120 psi at twenty-eight days.

The present disclosure includes compositions comprising between 40% and 55% air by volume, between 30% and 45% water by weight, between 5% and 25% calcium sulfoaluminate cement by weight, and between 35% and 55% scrubbed ash by weight, wherein the composition has compressive strength between 25 psi and 45 psi at four hours, a compressive strength between 95 psi and 115 psi at one day, and a compressive strength between 460 psi and 480 psi at twenty-eight days.

The present disclosure includes compositions comprising between 40% and 60% air by volume, between 30% and 45% water by weight, between 10% and 35% calcium sulfoaluminate cement by weight, and between 25% and 45% scrubbed ash by weight, wherein the composition has compressive strength between 60 psi and 80 psi at four hours, a compressive strength between 145 psi and 165 psi at one day, and a compressive strength between 355 and 375 psi at twenty-eight days.

The present disclosure includes compositions comprising between 40% and 55% air by volume, between 30% and 45% water by weight, between 5% and 25% calcium sulfoaluminate cement by weight, and between 35% and 55% baghouse fines by weight, wherein the composition has compressive strength between 50 psi and 70 psi at four hours, a compressive strength between 90 psi and 110 psi at one day, and a compressive strength between 105 psi and 125 psi at twenty-eight days.

The present disclosure includes compositions comprising between 40% and 60% air by volume, between 30% and 45% water by weight, between 10% and 35% calcium sulfoaluminate cement by weight, and between 25% and 45% baghouse fines by weight, wherein the composition has compressive strength between 75 psi and 95 psi at four hours, a compressive strength between 105 psi and 125 psi at one day, and a compressive strength between 100 psi and 120 psi at twenty-eight days.

The present disclosure includes compositions comprising between 40% and 55% air by volume, between 25% and 45% water by weight, between 15% and 40% calcium sulfoaluminate cement by weight, and between 20% and 40% agricultural lime by weight, wherein the composition has compressive strength between 130 psi and 150 psi at four hours, a compressive strength between 160 psi and 180 psi at one day, and a compressive strength between 200 psi and 220 psi at twenty-eight days.

The present disclosure includes compositions comprising between 40% and 55% air by volume, between 25% and 45% water by weight, between 20% and 40% calcium sulfoaluminate cement by weight, and between 20% and 40% recycled glass by weight, wherein the composition has compressive strength between 35 psi and 55 psi at four hours, a compressive strength between 65 psi and 85 psi at one day, and a compressive strength between 100 psi and 120 psi at twenty-eight days.

The present disclosure includes compositions comprising between 45% and 65% air by volume, between 20% and 35% water by weight, between 5% and 30% calcium sulfoaluminate cement by weight, and between 45% and 55% fly ash by weight, wherein the composition has compressive strength between 30 psi and 50 psi at four hours, a compressive strength between 100 psi and 120 psi at one day, and a compressive strength between 180 psi and 200 psi at twenty-eight days.

The present disclosure includes compositions consisting essentially of between 40% and 65% air by volume, between 20% and 50% water by weight, between 5% and 50% calcium sulfoaluminate cement by weight, and between 20% and 55% filler by weight, wherein the composition has a compressive strength between 10 psi and 170 psi at four hours, a compressive strength between 20 psi and 310 psi at one day, and a compressive strength between 30 psi and 520 psi at twenty-eight days.

In some embodiments, compositions of the present disclosure may include water reducer or set retardant. In some embodiments, compositions are air entrained and in certain embodiments the air entrainment is achieved using preformed cellular foam.

While the disclosure will be described with respect to preferred embodiment configurations and with respect to particular compositions or methods used therein, it will be understood that the disclosure is not to be construed as limited in any manner by either such configuration or components described herein. Also, while the particular types of equipment, compositions and uses are described herein, it will be understood that such particular compositions, equipment or uses are not to be construed in a limiting manner. Instead, the functionality of those compositions and methods should be appreciated. These and other variations of the disclosure will become apparent to those skilled in the art upon a more detailed description of the disclosure.

The advantages and features which characterize the disclosure are pointed out with particularity in the claims annexed hereto and forming a part hereof. For a better understanding of the disclosure, however, reference should be had to the drawing which forms a part hereof and to the accompanying descriptive matter, in which there is illustrated and described an embodiment of the disclosure.

DETAILED DESCRIPTION

The present disclosure is useful in filling portions of large voids, such as mine shafts and excavated utility trenches, where traditional slow setting mixtures are not desired. It provides alternate means of producing a rapid-setting utility backfill material, in areas that rapid setting Class C fly ash is not available, but other types of powder-sized filler materials are available. It also provides alternate means of producing a rapid-setting utility backfill material that is less expensive than compositions comprised solely of calcium sulfoaluminate cement.

In an embodiment, calcium sulfoaluminate cement is used in addition to the filler materials. Calcium sulfoaluminate cement is used in various applications in the place of Portland cement where a fast setting time, high early strengths, and durability are required. The production of calcium sulfoaluminate cement creates less carbon dioxide than Portland cement. Calcium sulfoaluminate cement is available from, for example, CTS Cement Manufacturing Corp., 12442 Knott St., Garden Grove, California, 92841.

In an embodiment, calcium sulfoaluminate cement comprises between 90% and 100% by weight calcium sulfoaluminate cement and less than 0.1% by weight silica (crystalline quartz), and has a pH between 11 and 12 when wet, a relative density between 2.96 and 2.98 at 20 degrees Celsius, and a bulk density of 60 pounds per cubic foot.

Calcium sulfoaluminate cement may include belitic calcium sulfoaluminate cement, comprised of between 15% and 35% calcium sulfoaluminate, between 40% and 60% dicalcium silicate, and between 5% and 25% calcium sulfate. In some embodiments, calcium sulfoaluminate cement may be comprised of between 40% and 50% calcium oxide, between 15% and 40% aluminum oxide, between 15% and 25% sulfate, between 5% and 10% crystalline silica, and between 1% and 5% ferric oxide.

The calcium sulfoaluminate cement by weight of the composition may be between about 3% and 60% by weight of the composition, between about 5% and about 55%, between about 5% and about 50%, between about 5% and about 25%, between about 10% and about 35%, between about 15% and about 40%, between about 20% and about 40%, between about 5% and about 30%, or between about 25% and about 35%. In certain embodiments, the calcium sulfoaluminate cement by weight of the composition may be greater than 5%, greater than 10%, greater than 15%, greater than 20%, greater than 25%, greater than 30%, greater than 35%, greater than 40%, greater than 45%, greater than 50%, or greater than 55%. %. In certain embodiments, the calcium sulfoaluminate cement by weight of the composition may be less than 60%, less than 55%, less than 50%, less than 45%, less than 40%, less than 35%, less than 30%, less than 25%, less than 20%, less than 15%, or less than 10%.

In an embodiment, the filler is scrubbed ash. Fly ash is produced by capturing the smoke from burning coal in electric power plants. Prior to the Clean Air Act of 1973, this ash often escaped to the atmosphere as pollution. Subsequently, it has been captured in bag houses and is currently used as a replacement for Portland cement in concrete mixtures. Later, additional environmental equipment was installed at the power plant, called "scrubbers," that injected lime into the exhaust stacks to remove mercury and sulfur emissions to the atmosphere. This resulted in higher sulfite levels in the scrubbed (fly) ash and made it less desirable for use in concrete. This scrubbed ash is often destined to the landfill, but the present disclosure provides a new use. Scrubbed ash is not chemically inert, and in fact contain forms of gypsum; gypsum is a set-retarding compound used in Portland cement. The set-retarding properties of gypsum in scrubbed ash generally make it a poor filler when combined with Class C ash or Portland cement when a fast setting time and high early strength is desired. Surprisingly, the use of scrubbed ash with compositions of the present disclosure works well. Scrubbed ash is commercially available from various sources. One such source is Colorado Springs Utilities, Ray D. Nixon Power Plant, 6598 Ray Nixon Rd., Fountain, CO 80817.

In an embodiment, the filler is baghouse fines. Baghouse fines are dust-sized micro aggregates that are typically, but not necessarily, captured in bag houses to prevent air pollution, and could contain inert minerals, lime, cement kiln dust, or other chemical or mineral materials. Thus, baghouse fines include micro aggregates recovered via one or more of fabric filters (baghouses), wet scrubbers, electrostatic precipitators (wet or dry), and mechanical collectors (e.g., cyclones). The materials used in this testing were obtained from an asphaltic concrete plant where various aggregate materials are heated to 400 degrees Fahrenheit or higher in a drum drier, before the liquid asphalt cement is mixed in. In the process of flame-heated drying, the dust particles become airborne when the moisture is first driven off. This dust is captured in the bag house to prevent air pollution. Normally, the dust is re-introduced into the aggregate and asphalt mix. However, there are benefits of harvesting some of these dust materials through the baghouse, reducing the dust content of the mixture if another use can be found for them. The present disclosure creates a new, beneficial use for "harvested" baghouse fines (whether from an asphalt plant or otherwise). The unexpected benefit of developing a new market or beneficial use of baghouse fines, is that with many hot-mix asphalt plants located across America, there is an extensive supply of this inert, super-fine aggregate that should be economically available, since harvesting it is economically beneficial to normal hot-mix asphalt production. Alternately, other industrial processes may be a source of similar micro aggregates (baghouse fines) or other chemicals or minerals having similar sizes. Bag houses fines are commercially available from various sources, e.g., Martin Marietta Spec. Agg. Asphalt Plant. 19701 West Colfax Avenue Golden, Colorado 80401.

In an embodiment, the filler is fly ash. Fly ash, a by-product of coal-fired electric power production can be used as a substitute for Portland cement. The use of fly ash has many social benefits for sustainability, as fly ash is a 100% recycled, post-consumer product. Further, no additional carbon dioxide is produced, no additional natural resources are mined, and no additional fossil fuels are used. By contrast, the use of Portland cement requires approximately 3500 lbs of mined resources and fossil fuels to produce each ton of cement. In addition, the avoidance of carbon dioxide generation by using fly ash creates carbon credits, which adds economic value to any given project. Class F fly ash is available, for example, from Salt River Materials Group, 8800 E. Chaparral Road, Ste. 155, Scottsdale, Arizona, 85250 or Tri-State Generation & Transmission, Craig Power Station, 2101 South Ranney Street, Craig, Colorado 81625.

Fly ash can be referred to as either cementitious or pozzolanic. A cementitious material is one that hardens when mixed with water. A pozzolanic material will also harden with water but only after activation with an alkaline substance such as lime.

Two major classes of fly ash are specified in ASTM C618 on the basis of their chemical composition resulting from the type of coal burned; these are designated Class F and Class C. Class F is fly ash normally produced from burning anthracite or bituminous coal, and Class C is normally produced from the burning of subbituminous coal or lignite. Class C fly ash usually has cementitious properties in addition to pozzolanic properties due to free lime, whereas Class F is rarely cementitious when mixed with water alone.

Some relevant characteristics of fly ash are loss on ignition (LOI), fineness, chemical composition and uniformity. LOI is a measurement of unburned carbon (coal) remaining in the ash. High carbon levels, the type of carbon (i.e., activated), the interaction of soluble ions in fly ash, and the variability of carbon content are all factors affecting the performance of fly ashes.

Fineness of fly ash is most closely related to the operating condition of the coal crushers and the grindability of the coal itself. Fineness is generally defined as the percent by weight of the material retained on the 0.044 mm (No. 325) sieve. A coarser gradation can result in a less reactive ash and could contain higher carbon contents.

Chemical composition of fly ash relates directly to the mineral chemistry of the parent coal and any additional fuels or additives used in the combustion or post-combustion processes.

Uniformity of fly ash characteristics from shipment to shipment is another factor to consider when selecting fly ash or using fly ash. Some guidance documents used for fly ash quality assurance include ACI 229R (Controlled Low Strength Material), ASTM C311 (Sampling and Testing Fly Ash or Natural Pozzolans for Use as Mineral Admixture in Portland Cement Concrete), AASHTO M 295 and ASTM C618 (Fly Ash and Raw or Calcined Natural Pozzolan for Use as a Mineral Admixture in Portland Cement Concrete), ASTM C593 (Fly Ash and Other Pozzolans for Use with Lime), ASTM D5239 (Standard Practice for Characterizing Fly Ash for Use in Soil Stabilization), and ASTM E1861 (Guide for the Use of Coal Combustion by-products in Structural Fills).

In an embodiment, the fly ash used is Class F fly ash, which is a mixture of inorganic materials that comprises over 70% silicon dioxide, aluminum oxide, and ferric oxide; less than 5% sulfur trioxide; less than 3% moisture; less than 1.5% available alkalies as sodium oxide; less than 5% total alkalies as sodium oxide; and has less than 6% loss on ignition. Class F fly ash has a fineness of less than 34% at +325 Sieve. Class F fly ash has a pH between 9 and 11 in water, a relative density between 1.8 and 2.7, and is 0.05% by weight soluble in water.

In an embodiment, the filler is agricultural lime. Agricultural lime is commercially available, e.g., from Spartan Rock Products, 2591 Boonesborough Road, Richmond, KY, 40475. In an embodiment, the agricultural lime used has a minimum chemical analysis of at least 75% calcium carbonate, at least 12% magnesium carbonate, at least 30% calcium, and at least 3% magnesium. It has a fineness of 70% at a #200 Sieve, and 100% at a #20 Sieve. It has a calcium carbonate equivalency of 95%.

In an embodiment, the filler is recycled glass. Recycled glass can be obtained from facilities that recycle or process glass, for example, from Clear Intentions, 5701 Downing St., Denver, Colorado, 80216. In an embodiment, recycled glass is recycled glass agricultural with a fineness of 43.3% at a #200 sieve and 100% at a #30 Sieve.

In an embodiment, the filler is comprised of a combination of one or more of cement kiln dust, scrubbed ash, baghouse fines, fly ash, agricultural lime, recycled glass, other industrial byproducts, or other fillers known in the industry.

In an embodiment, a composition of the present disclosure will have between about 10% and about 70% filler by weight of the composition, between about 15% and about 60% filler, between about 20% and about 55% filler, between about 35% and about 55% filler, between about 25% and about 45% filler, between about 20% and about 40%, or between about 45% and about 55%. In certain embodiments, a composition of the present disclosure will have less than about 80% filler, less than about 70% filler, less than about 65% filler, less than about 60% filler, less than about 55% filler, less than about 50% filler, less than about 45% filler, or less than about 40% filler. In still other embodiments, a composition of the present disclosure will have greater than about 10% filler, greater than about 20% filler, greater than about 25% filler, greater than about 30% filler, greater than about 35% filler, greater than about 40% filler, greater than about 45% filler, or greater than about 50% filler.

The air content of the compositions of the present disclosure will vary depending on the desired properties of the composition. For example, the amount of air within the composition helps control the final strength of the backfill. Therefore, a faster set time can be achieved with blends using more calcium sulfoaluminate cement and lower water/calcium sulfoaluminate cement ratios, while the ultimate strength can be limited with higher amounts of air content.

In some embodiments, the air content may be determined by the following formula using wet densities before and after the addition of air:

$$\text{Air content} = \frac{(\text{Unit Weights}_{no\ air} - \text{Unit Weight}_{air}) \times 100\%}{\text{Unit Weight}_{no\ air}}$$

In other embodiments, the air content can be determined using ASTM C231.

In certain embodiments, the air content is achieved by mixing an air entraining agent, i.e., a dry surfactant or liquid admixture into the fly ash and/or filler prior to addition of water. In these embodiments, the air content may by uniformly distributed by mixing directly in a truck or by mixing in a commonly used agitation/mixing device. The mixing process can occur with prior to addition of water, after addition of water or simultaneously with the addition of water.

In another embodiment, the air content is achieved by addition of an air entraining agent after mixture of the dry ingredients (calcium sulfoaluminate cement and possible filler) with water but prior to applying the composition to the void.

In specific embodiments, the air content may be achieved by adding a pre-formed cellular foam, e.g., Aerlite-ix foam liquid concentrate available from Aerix Industries, 7020 Snowdrift Road, Suite 102, Allentown, PA 18106 or 5916 McIntyre St, Golden, CO 80403. The pre-formed cellular foam may be pervious or non-pervious, and pre-foamed thereby reducing or alleviating the need to vigorously agitate the composition to activate the air entraining agent. Any suitable foaming agent may be used that achieves the desired end properties as described herein, e.g., an anionic foaming agent, a cationic foaming agent or a non-ionic foaming agent. An example of a pervious foam is AQUAERiX. Examples of a non-pervious foam are Aerlite or Aerlite-ix. When water penetration is not desired, a non-pervious cellular foam is preferred. Suitable cellular foam is available from a variety of sources, e.g., Aerix industries; Provoton Foam Concrete, 28 East Larkspur Lane, Bristol, IL 60512; Allied Foam Tech Corp., 146 Keystone Dr. Montgomeryville, PA 18936; and Vermillion LLC and Associates, 2176 Sargent Daly Dr., Chattanooga, TN 37421. The choice of an appropriate cellular foam is within one of skill in the art and may be dictated by cost, environmental concerns, or the need to meet the requirements of local or national agencies. In some embodiments, the foaming agent will conform to ASTM C869 and C796, in other embodiments the air entraining agent conforms to ASTM C260.

In some embodiments, the addition of cellular foam or similar air entraining agent may occur after the addition of water to the fly ash and/or filler immediately prior to the cementitious mixture leaving a mixing truck, as the cementitious mixture leaves the mixing truck (simultaneously) or after the cementitious mixture leaves the mixing truck. The amount of air entraining agent necessary for a given composition will vary with the desired air content, e.g., the desired final compressive strength.

The amount of air entraining agent necessary for a given composition will vary with the desired air content, e.g., the desired final compressive strength. In some embodiments, the final air content of the composition will be between about 30% and about 75% air by volume of the composition, between about 35% and about 70%, between about 40% and about 65%, between about 40% and about 60%, between about 40% and about 55%, or between about 45% and about 55%. In some embodiments, the final air content will be greater than 10%, greater than 15% air by volume of the composition, greater than 20%, greater than 25%, greater than 30%, greater than 35%, greater than 40%, greater than 45%, greater than 50%, greater than 55%, greater than 60%, or greater than about 65%. In other embodiments, the final air content of the composition will be less than 75% air by volume of the composition, less than 70%, less than 65%, less than 60%, less than 55%, less than 50%, less than 45%, less than 40%, or less than 35%.

In an embodiment of the presently disclosed composition, the water is standard city potable water. In an embodiment, the water may meet ASTM C1602 standards (Mixing water for the production of hydraulic cement concrete). In another embodiment, the water used in the composition is substantially purified of additional minerals or other impurities. In still another embodiment of the present disclosure, the water is non-potable water. In additional embodiments, the water is selected based on its natural impurities, i.e., specific mineral content like calcium, magnesium, iron, or similar water minerals. The water content of the presently disclosed composition may vary depending on desired flowability, setting time and final compressive strength. Any water included with additional ingredients, e.g., aqueous water retarders, foaming agents, etc. under the circumstances encountered in the field by the inventors has been negligible in comparison to the primary batch water and therefore has not been included in the above calculations. Depending on the actual water content of the additional ingredients used it may be necessary to consider the additional water in the final water concentrations.

In an embodiment of the present disclosure, a composition has a water content of between about 10% and about 65% water by weight of the composition, between about 15% and about 60%, between about 20% and about 55%, between about 20% and about 50%, between about 25% and about 50%, between about 30% and about 45% or between about 35% and about 40%. In additional embodiments, a composition has greater than about 10% water, greater than about 20% water, greater than about 25% water, greater than about 30% water, greater than about 35% water, greater than about 40% water, greater than about 45% water, greater than about 50% water, greater than about 55% water, and or greater than about 60% water. In other embodiments, a composition has less than about 70% water, less than about 65% water, less than about 60% water, less than about 55% water, less than about 50% water, less than about 45% water, or less than about 40% water. Any water included with additional ingredients, e.g, aqueous water retarders, foaming agents, etc. under the circumstances encountered in the field by the inventors has been negligible in comparison to the primary batch water and therefore has not been included in the above calculations. Depending on the actual water content of the additional ingredients used it may be necessary to consider the additional water in the final water concentrations.

In some embodiments, the compositions of the present disclosure may further comprise a water reducer. Water reducers may be used when a higher final strength is desired at a specified density and fluidity. Water reducers can also create more fluidity with the same water content and strength levels. In some embodiments the water reducer will be powder while in other embodiments it will be a liquid water reducer. In an embodiment, the water reducer is CHRYSO® 150 Chryso Inc., 5090 Nome Street, Denver, Colorado 80239 or similar composition suitable for use in the disclosed compositions. A water reducer is a chemical (e.g., chemical composition) that allows a mixture to maintain the same fluidity with less water or more fluidity with the same amount of water.

The composition disclosed in some embodiments may include an accelerant or a retardant to increase or decrease the setting time of the composition, depending on what is desirable for the specific application. The accelerant or retardant in some disclosed compositions may be citric acid, aluminum sulfate, or some combination thereof.

Compositions of the present disclosure will have a range of compressive strengths at various times after the addition of a composition to a void depending on the desired properties of the composition. For example, and similar to set time, a higher earlier compressive strength is advantageous when working when backfilling trenches in a roadway or other highly traveled area. The higher, earlier compressive strength allows for the backfilled void to be patched and reopened to use at an earlier time. Again, despite the desire for a high earlier compressive strength the final compressive strength must not exceed the local agency standards, i.e., maintain good removability modulus numbers.

In certain embodiments, the compressive strength is measured at 4 hours, 6 hours, 1 day, 7 days and 28 days, where the 28-day measurement is considered the final compressive strength. In other embodiments, the compressive strength is measured more often at smaller intervals. In some embodiments, the compressive strength is measured at 90 days. In an embodiment, the compressive strength or bearing capacity or penetration resistance of a composition is measured at 4 hours, 6 hours, 1 day, 7 days and 28 days after backfilling using ASTM WK 27337 or C403.

In an embodiment, the compressive strength of a composition of the present disclosure at 4 hours will be between about 10 psi and about 170 psi, 15 psi and about 150 psi, between about 30 psi and about 50 psi, between about 115 psi and about 155 psi, between about 25 psi and about 55 psi. In additional embodiments, the compressive strength of the composition at 4 hours will be greater than about 10 psi, will be greater than about 15 psi, will be greater than about 20 psi, will be greater than about 30 psi, will be greater than about 50 psi, will be greater than about 70 psi, will be greater than about 90 psi or will be greater than about 115 psi. In an embodiment, the compressive strength of a composition of the present disclosure at 4 hours will be less than about 170 psi, less than about 155 psi, less than about 150 psi, less than about 100 psi, less than about 75 psi, or less than about 50 psi.

In an embodiment, the compressive strength of a composition of the present disclosure at 1 day will be between about 10 psi and about 400 psi, between about 20 psi and about 350 psi, between about 20 psi and about 310 psi, between about 20 psi and 200 psi, between about 100 psi and 120 psi, between about 140 psi and about 180 psi, between about 65 psi and about 95 psi, between about 200 psi and 350 psi, between about 250 psi and 350 psi, or between about 300 psi and 400 psi. In additional embodiments, the compressive strength of the composition at 1 day will be greater than about 10 psi, will be greater than about 20 psi, will be greater than about 50 psi, will be greater than about 75 psi, will be greater than about 150 psi, will be greater than about 200 psi, will be greater than about 250 psi, will be greater than about 300 psi, will be greater than 350 psi, will be greater than 400 psi. In certain embodiments, the compressive strength of the composition at 1 day will be less than about 400 psi, less than about 300 psi, less than about 250 psi, less than about 200 psi, less than about 150 psi, or less than about 100 psi.

In an embodiment, the compressive strength of a composition of the present disclosure at 28 days will be between about 20 psi and about 700 psi, between about 30 psi and about 520 psi, between about 130 psi and about 520 psi, between about 30 psi and 220 psi, between about 180 psi and 200 psi, between about 115 psi and 220 psi, between about 85 psi and 120 psi, between about 460 psi and 480 psi, between about 355 psi and 375 psi, or between about 105 psi and 125 psi. In additional embodiments, the compressive strength of the composition at 28 days will be greater than about 20 psi, will be greater than about 30 psi, will be greater than about 50 psi, will be greater than about 75 psi, will be greater than about 150 psi, will be greater than about 200 psi, will be greater than about 250 psi, will be greater than 300 psi, will be greater than 350 psi, will be greater than about 400 psi, will be greater than 450 psi, or will be greater than 400 psi. In certain embodiments, the compressive strength of the composition at 28 days will be less than about 700 psi, less than about 600 psi, less than about 500 psi, less than about 400 psi, less than about 350 psi, less than about 300 psi, less than about 250 psi, less than 200 psi, or less than 150 psi.

In an embodiment of the present disclosure, an important consideration is the possible re-excavation of the backfilled composition by standard or ordinary excavation equipment. One measure of how easily a previously backfilled composition can be removed is the Removability Modulus ("RE"). The Removability Modulus is a commonly used industry standard for assigning a value to how easily a backfilled composition can be removed. The lower the RE number the easier the backfilled composition can be re-excavated. The Removability Modulus can be determined by the following formula:

$$RE = \frac{W^{1.5} \times 104 \times C^{0.5}}{10^6}$$

W=in-situ unit weight (pcf)
C=28 day compressive strength (psi)

In an embodiment of the present disclosure, the RE factor of a composition is between about 0.3 and 1.0.

In an embodiment, determining the compressive strength and densities for a combination of fly ashes may include using ASTM C495 and C138 or other common tests in the industry. In this disclosure compressive strengths were measured using ASTM C495. In alternative embodiments, the compressive strength is determined using other methods apparent to one of skill in the art. In some embodiments, determining the compressive strength and densities for a combination of fly ashes includes plotting the results of compressive strength testing as a function of the water to fly ash ratio.

Determining the amount of air content necessary to achieve a predetermined compressive strength and removability modulus can include testing various or the same combination of fly ash and/or filler with various air contents to determine the air content necessary to achieve a desired compressive strength and/or removability modulus.

Mixing calcium sulfoaluminate cement and filler to a predetermined ratio can include pre-mixing the dry ingredients prior to arriving at the construction site or mixing the dry ingredients at the construction site.

In an embodiment, the addition of water to the mix of calcium sulfoaluminate cement and filler occurs at the construction site. However, in other embodiments, the water is added prior to arrival at the construction site, e.g., in the drum of a ready mix truck. The addition of water may occur inside the drum of a volumetric mixing truck or may occur as the dry mix leaves or after the dry mix has left the mixing truck, e.g., while the dry mix is moving thru a spiral auger.

In some embodiments, the addition of air to the wet mixture can occur simultaneously with the addition of water to the dry ingredients or after the addition of water to the dry ingredients. In some embodiments, a cellular foam providing air content is placed directly onto a wet mixture comprising the calcium sulfoaluminate cement, filler and water. In other embodiments, the air content is provided by the addition of a dry surfactant to calcium sulfoaluminate cement and/or filler prior to addition of water or by using a liquid air entraining admixture during mixing.

In several described embodiments, the completion of the backfill composition occurs at the construction site, e.g., by addition of water and/or air content; however, in other embodiments, the water, air content (e.g., cellular foam), calcium sulfoaluminate cement and/or filler may be pre-mixed offsite. In this embodiment, a slower set time—thereby allowing transportation of the premixed composition to the construction site—can be achieved using a retarding agent. In an embodiment, the retarding agent is citric acid or boric acid (or a combination thereof) while in other embodiments the retarding agent is any agent capable of retarding the set time of the composition.

The addition of the composition to the void can be achieved using buckets, chutes, pumps, conveyors, hoses, augers or any method routinely used with Portland cement-based compositions.

The foregoing description of the exemplary embodiments of the disclosure has been presented for the purposes of illustration and description. They are not intended to be exhaustive or to limit the disclosure to the precise forms disclosed. Many modifications and variations are possible in light of the above teaching. It is intended that the scope of the disclosure be limited not with this detailed description, but rather by the claims appended hereto.

EXAMPLES

The weight of the ingredients in the following examples have been normalized to provide one cubic yard of final composition. That is, the actual amounts used in the examples have been proportionally increased or decreased based on the final volume achieved to one cubic yard. For example, if a laboratory batch of 25 lbs cementitious fly ash and 8 lbs of water yielded a final volume of 0.01 cubic yard, the example would be reported below as 2,500 lbs fly ash and 800 lbs water.

Example 1

Sixteen embodiments of the compositions described above were prepared for testing and evaluation, as well as three compositions that contained no filler (RS-35, RS-35-60, and RS-35-70). The components for each of the compositions are set forth below based on pounds per cubic yard (lb/cy) and percent (%) of the composition by weight. The RapidSet in each composition is from CTS Cement Manufacturing Corp., 12442 Knott St., Garden Grove, California, 92841 and includes the calcium sulfoaluminate. The water for each composition is standard tap water. The foam for each composition is Aerlite-ix foam liquid concentrate available from Aerix Industries, 7020 Snowdrift Road, Suite 102, Allentown, PA 18106 or 5916 McIntyre St, Golden, CO 80403. The scrubbed ash for the Scrubbed Ash compositions is from Colorado Springs Utilities, Ray D. Nixon Power Plant, 6598 Ray Nixon Rd., Fountain, Colorado 80817. The baghouse fines (BHF) for the BHF compositions are from Martin Marietta Spec. Agg. Asphalt Plant. 19701 West Colfax Avenue Golden, Colorado 80401. The fly ash in the F Ash compositions is Class F fly ash, from Salt River Materials Group, 8800 E. Chaparral Road, Ste. 155, Scottsdale, Arizona, 85250. The agricultural lime for the Ag. Lime compositions is from Spartan Rock Products, 2591 Boonesborough Rd, Richmond Kentucky 40475. The recycled glass for the recycles glass compositions is from Clear Intentions, 5701 Downing St., Denver, Colorado, 80216. Mix ID's are consistent throughout the Examples and descriptions of the RapidSet, water, foam, scrubbed ash, baghouse fines, fly ash, agricultural lime, and recycled glass are consistent throughout the Examples unless otherwise noted.

By way of example, composition RN-15-85 comprises 137 lbs/cy of RapidSet (which includes calcium sulfoaluminate), 776 lbs/cy scrubbed ash, 547 lbs/cy water, and 12.5 cf/cy foam as disclosed in Table 1. Accordingly, RN-15-85 comprises 9.2% RapidSet by weight of the composition (this includes 8.3%-9.2% calcium sulfoaluminate by weight of the composition), 52.3% scrubbed ash by weight of the composition, 38.5% water by weight of the composition, and 0.033% foam concentrate by weight of the composition which equate to 44.9% air by volume of the composition (see Table 3) as disclosed by Table 2. RN-25-75, RN-30-70, RN-40-60, RN-50-50, RB-20-80, RB-25-75, RB-30-70, RB-40-60, RB-50-50, RAL-40-60, RAL-50-50, RRG-30-70, RRG-40-60, RRG-50-50, and RSFA-FFF represent additional composition of the present disclosure with components for each composition disclosed in Table 1 and Table 2.

TABLE 1

Components of Sixteen Embodiments of the CLSM Compositions (lb/CY).

| Mix ID | RapidSet | Scrubbed Ash | BHF | F Ash | Ag. Lime | Recyc. Glass | Water | Foam (cf/CY) |
|---|---|---|---|---|---|---|---|---|
| RS-35 | 630 | 0 | 0 | 0 | 0 | 0 | 315 | 18.6 |
| RS-35-60 | 568 | 0 | 0 | 0 | 0 | 0 | 341 | 18.5 |
| RS-35-70 | 535 | 0 | 0 | 0 | 0 | 0 | 374 | 18.1 |
| RN-15-85 | 137 | 776 | 0 | 0 | 0 | 0 | 547 | 12.5 |
| RN-25-75 | 232 | 696 | 0 | 0 | 0 | 0 | 557 | 12.4 |

TABLE 1-continued

Components of Sixteen Embodiments of the CLSM Compositions (lb/CY).

| | Composition (lb/CY) | | | | | | | |
|---|---|---|---|---|---|---|---|---|
| Mix ID | RapidSet | Scrubbed Ash | BHF | F Ash | Ag. Lime | Recyc. Glass | Water | Foam (cf/CY) |
| RN-30-70 | 278 | 650 | 0 | 0 | 0 | 0 | 557 | 12.4 |
| RN-40-60 | 338 | 506 | 0 | 0 | 0 | 0 | 506 | 13.8 |
| RN-50-50 | 456 | 456 | 0 | 0 | 0 | 0 | 547 | 12.9 |
| RB-20-80 | 186 | 0 | 743 | 0 | 0 | 0 | 557 | 12.7 |
| RB-25-75 | 232 | 0 | 696 | 0 | 0 | 0 | 557 | 12.8 |
| RB-30-70 | 278 | 0 | 650 | 0 | 0 | 0 | 557 | 12.8 |
| RB-40-60 | 338 | 0 | 506 | 0 | 0 | 0 | 506 | 14.1 |
| RB-50-50 | 456 | 0 | 456 | 0 | 0 | 0 | 547 | 13.1 |
| RAL-40-60 | 376 | 0 | 0 | 0 | 564 | 0 | 517 | 13.5 |
| RAL-50-50 | 470 | 0 | 0 | 0 | 470 | 0 | 517 | 13.5 |
| RRG-30-70 | 292 | 0 | 0 | 0 | 0 | 681 | 486 | 13.3 |
| RRG-40-60 | 389 | 0 | 0 | 0 | 0 | 583 | 486 | 13.4 |
| RRG-50-50 | 486 | 0 | 0 | 0 | 0 | 486 | 486 | 13.5 |
| RSFA-FFF | 248 | 0 | 0 | 744 | 0 | 0 | 357 | 14.5 |

TABLE 2

Components of Sixteen Embodiments of the CLSM Compositions (%). Total water content and Foam Concentrate in % composition calculated on the basis of a foam density of 2 pcf, and a dilution ratio of 1 part concentrate to 50 parts water.

| | Composition % | | | | | | | | |
|---|---|---|---|---|---|---|---|---|---|
| Mix ID | RapidSet | Caclium SulfoAluminate | Scrubbed Ash | BHF | F Ash | Ag. Lime | Recyc. Glass | Water | Foam Concentrate |
| RS-35 | 64.1% | 57.7%-64.1% | 0.0% | 0.0% | 0.0% | 0.0% | 0.0% | 35.8% | 0.074% |
| RS-35-60 | 60.0% | 54.0%-60.0% | 0.0% | 0.0% | 0.0% | 0.0% | 0.0% | 39.9% | 0.077% |
| RS-35-70 | 56.6% | 50.9%-56.6% | 0.0% | 0.0% | 0.0% | 0.0% | 0.0% | 43.3% | 0.075% |
| RN-15-85 | 9.2% | 8.3%-9.2% | 52.3% | 0.0% | 0.0% | 0.0% | 0.0% | 38.5% | 0.033% |
| RN-25-75 | 15.4% | 13.8%-15.4% | 46.1% | 0.0% | 0.0% | 0.0% | 0.0% | 38.5% | 0.032% |
| RN-30-70 | 18.4% | 16.6%-18.4% | 43.1% | 0.0% | 0.0% | 0.0% | 0.0% | 38.5% | 0.032% |
| RN-40-60 | 24.5% | 22.1%-24.5% | 36.7% | 0.0% | 0.0% | 0.0% | 0.0% | 38.7% | 0.039% |
| RN-50-50 | 30.7% | 27.6%-30.7% | 30.7% | 0.0% | 0.0% | 0.0% | 0.0% | 38.5% | 0.034% |
| RB-20-80 | 12.3% | 11.1%-12.3% | 0.0% | 49.2% | 0.0% | 0.0% | 0.0% | 38.5% | 0.033% |
| RB-25-75 | 15.4% | 13.8%-15.4% | 0.0% | 46.1% | 0.0% | 0.0% | 0.0% | 38.5% | 0.033% |
| RB-30-70 | 18.4% | 16.6%-18.4% | 0.0% | 43.0% | 0.0% | 0.0% | 0.0% | 38.5% | 0.033% |
| RB-40-60 | 24.5% | 22.1%-24.5% | 0.0% | 36.7% | 0.0% | 0.0% | 0.0% | 38.7% | 0.040% |
| RB-50-50 | 30.7% | 27.6%-30.7% | 0.0% | 30.7% | 0.0% | 0.0% | 0.0% | 38.6% | 0.035% |
| RAL-40-60 | 25.3% | 22.8%-25.3% | 0.0% | 0.0% | 0.0% | 38.0% | 0.0% | 36.6% | 0.036% |
| RAL-50-50 | 31.7% | 28.5%-31.7% | 0.0% | 0.0% | 0.0% | 31.7% | 0.0% | 36.6% | 0.036% |
| RRG-30-70 | 19.7% | 17.7%-19.7% | 0.0% | 0.0% | 0.0% | 0.0% | 45.8% | 34.5% | 0.035% |
| RRG-40-60 | 26.2% | 23.6%-26.2% | 0.0% | 0.0% | 0.0% | 0.0% | 39.3% | 34.5% | 0.035% |
| RRG-50-50 | 32.7% | 29.5%-32.7% | 0.0% | 0.0% | 0.0% | 0.0% | 32.7% | 34.5% | 0.036% |
| RSFA-FFF | 18.0% | 16.2%-18.0% | 0.0% | 0.0% | 54.0% | 0.0% | 0.0% | 28.0% | 0.041% |

Example 2

The compositions of Example 1 (disclosed in Table 1 and Table 2 where MixID remains consistent among all Tables) are disclosed below with their respective water to powder ratios (W/P), unit weights (UW (pcf)), percent air by volume of the composition, slump spread flowability (Spread (inches)) of each composition as determined by a flow consistency test of CLSM, D6103, the compressive strength of each composition at 4 hours, 1 day, 7 days, and 28 days, the penetration of each composition at 4 hours using a pocket penetrometer (4 hour Pen. (tsf)), and the removability (RE) of each composition following 28 days.

By way of example, composition RN-25-75 has a 0.6 water to powder ratio, a 55 pcf unit weight, 45.8% air by volume of the composition, a spread of 9 inches, a 4-hour compressive strength of 24 psi, a 1-day compressive strength of 90 psi, a 7-day compressive strength of 135 psi, a 28-day compressive strength of 422 psi, a 4 hour penetration resistance of 1.25 tsf, and an RE of 0.87.

The compositions of the present disclosure are fast setting and obtain early strength while maintaining economic advantages through the use of various fillers. Specifically, the compositions of the present disclosure can replace currently used and available compositions, e.g., class C fly ash-based compositions, by using various fillers in combination with calcium sulfoaluminate cement. Surprisingly, compositions using scrubbed ash worked well in combination with calcium sulfoaluminate cement despite the present of gypsum in the scrubbed ash.

TABLE 3

Compressive Strength (psi) Summary With Removability Modulus.

| Mix ID | W/P | UW (pcf) | Air (%) | Spread (in) | Compressive Strength (psi) | | | | | 4 hr Pen. (tsf) | RE |
|---|---|---|---|---|---|---|---|---|---|---|---|
| | | | | | 4-hr | 6-hr | 1-day | 7-day | 28-day | | |
| RS-35 | 0.5 | 35 | 68.8 | 8 | 95 | — | 140 | 170 | 210 | 4.5 | 0.31 |
| RS-35-60 | 0.6 | 35 | 66.3 | 9 | 166 | — | 181 | 234 | 304 | 4.5 | 0.38 |
| RS-35-70 | 0.7 | 35 | 65.0 | 7 | 160 | — | 177 | 178 | 210 | 4.5 | 0.31 |
| RN-15-85 | 0.6 | 55 | 44.9 | 9.5 | — | 15 | 27 | 54 | 142 | — | 0.51 |
| RN-25-75 | 0.60 | 55 | 45.8 | 9 | 24 | — | 90 | 135 | 422 | 1.25 | 0.87 |
| RN-30-70 | 0.60 | 55 | 46.0 | 11 | 35 | — | 105 | 174 | 472 | 1.50 | 0.92 |
| RN-40-60 | 0.60 | 50 | 51.2 | 10 | 72 | — | 157 | 254 | 366 | 3.00 | 0.70 |
| RN-50-50 | 0.60 | 55 | 46.1 | 10 | 134 | — | 302 | 402 | 498 | 4.50 | 0.95 |
| RB-20-80 | 0.60 | 55 | 47.2 | 9 | 15 | — | 30 | 34 | 38 | 0.75 | 0.26 |
| RB-25-75 | 0.60 | 55 | 47.2 | 9 | 31 | — | 56 | 62 | 65 | 1.50 | 0.34 |
| RB-30-70 | 0.60 | 55 | 47.3 | 9 | 62 | — | 101 | 109 | 114 | 3.00 | 0.45 |
| RB-40-60 | 0.60 | 50 | 52.3 | 9 | 85 | — | 114 | 127 | 110 | 3.25 | 0.39 |
| RB-50-50 | 0.60 | 55 | 47.0 | 10 | 154 | — | 189 | 177 | 198 | 4.50 | 0.60 |
| RAL-40-60 | 0.55 | 55 | 48.2 | 10.5 | 129 | — | 152 | 147 | 128 | 4.50 | 0.48 |
| RAL-50-50 | 0.55 | 55 | 48.4 | 13 | 142 | — | 168 | 163 | 208 | 4.50 | 0.61 |
| RRG-30-70 | 0.50 | 55 | 47.6 | 12 | 42 | — | 76 | 82 | 107 | 2.00 | 0.44 |
| RRG-40-60 | 0.50 | 55 | 48.0 | 12 | 39 | — | 83 | 84 | 97 | 2.75 | 0.42 |
| RRG-50-50 | 0.50 | 55 | 48.3 | 13 | 43 | — | 77 | 100 | 110 | 1.75 | 0.44 |
| RSFA-FFF | 0.36 | 50 | 53.8 | 10 | 40 | — | 110 | 140 | 190 | — | 0.51 |

What is claimed is:

1. A composition for backfilling a void comprising:
   between 40% and 55% air by volume;
   between 30% and 45% water by weight;
   between 5% and 25% calcium sulfoaluminate cement by weight; and
   between 35% and 55% filler by weight, where the filler is one or more of scrubbed ash, baghouse fines, and fly ash,
   wherein the composition has a compressive strength between 15 psi and 150 psi at four hours, a compressive strength between 20 psi and 310 psi at one day, and a compressive strength between 130 psi and 520 psi at twenty-eight days.

2. The composition of claim 1, wherein the filler is scrubbed ash.

3. The composition of claim 1, wherein the filler is baghouse fines.

4. The composition of claim 1, wherein the filler is fly ash.

5. The composition of claim 1, wherein the filler is baghouse fines and the composition has a compressive strength between 15 psi and 150 psi at four hours, a compressive strength between 20 psi and 200 psi at one day, and a compressive strength between 130 psi and 220 psi at twenty-eight days.

6. The composition of claim 1, wherein the filler is fly ash and the composition has a compressive strength between 30 psi and 50 psi at four hours, a compressive strength between 100 psi and 120 psi at one day, and a compressive strength between 180 psi and 200 psi at twenty-eight days.

7. The composition of claim 1, wherein the composition comprises:
   between 40% and 55% air by volume;
   between 30% and 45% water by weight;
   between 5% and 25% calcium sulfoaluminate cement by weight; and
   between 35% and 55% filler by weight, where the filler is scrubbed ash,
   wherein the composition has compressive strength between 25 psi and 45 psi at four hours, a compressive strength between 95 psi and 115 psi at one day, and a compressive strength between 460 psi and 480 psi at twenty-eight days.

8. The composition of claim 1, wherein the composition comprises:
   between 40% and 55% air by volume;
   between 30% and 45% water by weight;
   between 10% and 25% calcium sulfoaluminate cement by weight; and
   between 35% and 55% filler by weight, where the filler is scrubbed ash,
   wherein the composition has compressive strength between 60 psi and 80 psi at four hours, a compressive strength between 145 psi and 165 psi at one day, and a compressive strength between 355 and 375 psi at twenty-eight days.

9. The composition of claim 1, wherein the composition comprises:
   between 40% and 55% air by volume;
   between 30% and 45% water by weight;
   between 5% and 25% calcium sulfoaluminate cement by weight; and
   between 35% and 55% filler by weight, where the filler is baghouse fines,
   wherein the composition has compressive strength between 50 psi and 70 psi at four hours, and a compressive strength between 90 psi and 110 psi at one day.

10. The composition of claim 1, wherein the composition comprises:
    between 40% and 55% air by volume;
    between 30% and 45% water by weight;
    between 10% and 25% calcium sulfoaluminate cement by weight; and
    between 35% and 55% filler by weight, where the filler is baghouse fines,
    wherein the composition has compressive strength between 75 psi and 95 psi at four hours, and a compressive strength between 105 psi and 125 psi at one day.

11. The composition of claim 1, wherein the composition comprises:
- between 45% and 55% air by volume;
- between 30% and 35% water by weight;
- between 5% and 25% calcium sulfoaluminate cement by weight; and
- between 45% and 55% filler by weight, where the filler is fly ash,
- wherein the composition has compressive strength between 30 psi and 50 psi at four hours, a compressive strength between 100 psi and 120 psi at one day, and a compressive strength between 180 psi and 200 psi at twenty-eight days.

12. A composition for backfilling a void consisting essentially of:
- between 40% and 55% air by volume;
- between 30% and 45% water by weight;
- between 5% and 25% calcium sulfoaluminate cement by weight; and
- between 35% and 55% filler by weight, where the filler is one or more of scrubbed ash, baghouse fines, and fly ash,
- wherein the composition has a compressive strength between 15 psi and 150 psi at four hours, a compressive strength between 20 psi and 310 psi at one day, and a compressive strength between 130 psi and 520 psi at twenty-eight days.

\* \* \* \* \*